United States Patent
Woodall et al.

(10) Patent No.: US 11,365,001 B1
(45) Date of Patent: Jun. 21, 2022

(54) METHOD OF PROPULSOR MANAGEMENT IN ELECTRIC AIRCRAFT

(71) Applicant: BETA AIR, LLC, South Burlington, VT (US)

(72) Inventors: Christopher J. Woodall, Burlington, VT (US); Riley Griffin, Montpelier, VT (US); Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/362,454

(22) Filed: Jun. 29, 2021

(51) Int. Cl.
*B64C 29/00* (2006.01)
*B64D 27/24* (2006.01)

(52) U.S. Cl.
CPC .......... *B64C 29/0033* (2013.01); *B64D 27/24* (2013.01); *B64D 2221/00* (2013.01)

(58) Field of Classification Search
CPC . B64C 29/00; B64C 29/0008; B64C 29/0016; B64C 29/0025; B64C 2201/042; B64C 2201/108; B64C 2201/165; B64C 29/0033; B64D 27/24; B64D 2221/00
See application file for complete search history.

(56) References Cited

U.S. PATENT DOCUMENTS

| | | | |
|---|---|---|---|
| 9,120,560 B1 * | 9/2015 | Armer | B64C 29/0025 |
| 9,731,820 B1 | 8/2017 | Godlasky | |
| 9,845,150 B2 | 12/2017 | Kroo | |
| 10,336,443 B2 * | 7/2019 | Louis | B64C 27/30 |
| 10,336,448 B2 | 7/2019 | McLaren | |
| 10,577,091 B2 | 3/2020 | Parks | |
| 10,983,534 B2 | 4/2021 | English | |
| 2016/0207625 A1 * | 7/2016 | Judas | B64C 29/0025 |
| 2017/0225779 A1 * | 8/2017 | Gamble | B64C 29/0091 |
| 2018/0118335 A1 * | 5/2018 | Gamble | B64C 27/30 |
| 2018/0362169 A1 | 12/2018 | Du | |
| 2019/0106206 A1 | 4/2019 | Shi | |
| 2019/0337613 A1 * | 11/2019 | Villa | B64C 9/00 |
| 2020/0023962 A1 | 1/2020 | Filingham | |
| 2020/0079501 A1 | 3/2020 | Graves | |
| 2020/0164976 A1 | 5/2020 | Lovering | |

(Continued)

FOREIGN PATENT DOCUMENTS

WO WO-2015157114 A1 * 10/2015 ............... B64D 1/02

OTHER PUBLICATIONS

Title: Benefit analysis and system design considerations for drag reduction of inactive hover rotors on electric fixed-wing VTOL vehicles By: Stahl, Philipp Date: Jun. 25, 2018.

*Primary Examiner* — Benjamin P Lee
(74) *Attorney, Agent, or Firm* — Caldwell Intellectual Property Law; Keegan Caldwell; Charles Dresser

(57) ABSTRACT

A system for propulsion management of an electric aircraft. The system includes an electric aircraft that is configured to transition between a hover state and a fixed-wing flight state. The electric aircraft includes at least one set of a plurality of propulsors that are coupled to the electric aircraft. The system includes a flight controller that is coupled to the electric aircraft. The flight controller is configured to detect a state transition of the electric aircraft from the hover state to the fixed-wing flight state. The flight controller is configured to send a parking or unparking command to the at least one set of a plurality of propulsors to reduce air drag.

20 Claims, 7 Drawing Sheets

(56) References Cited

U.S. PATENT DOCUMENTS

| | | |
|---|---|---|
| 2020/0317332 A1 | 10/2020 | Didey |
| 2020/0391860 A1 | 12/2020 | Foskey |
| 2021/0031910 A1 | 2/2021 | Cornes |
| 2021/0107620 A1* | 4/2021 | Weekes ............... B64C 29/0025 |
| 2021/0114723 A1 | 4/2021 | Wittmaak, Jr. |
| 2021/0206487 A1* | 7/2021 | Iqbal ................... B64C 29/0083 |
| 2021/0229825 A1* | 7/2021 | Eppink ................... B64C 39/04 |
| 2021/0245873 A1* | 8/2021 | Tighe ..................... G05D 1/102 |

* cited by examiner

METHOD OF PROPULSOR MANAGEMENT IN ELECTRIC AIRCRAFT

FIELD OF THE INVENTION

The present invention generally relates to the field of electric aircraft. In particular, the present invention is directed to a system and method for propulsor management for an electric aircraft.

BACKGROUND

Modern electric aircraft, such as vertical landing and takeoff aircraft (eVTOL) may include a set of vertical propulsors. These vertical propulsors may be stationary and not in use during edgewise flight. As such, they may increase the air resistance and/or drag on the electric aircraft.

SUMMARY OF THE DISCLOSURE

In an aspect, a system for propulsion management of an electric aircraft includes an electric aircraft. The electric aircraft is configured to transition between a hover state and a fixed-wing flight state. The electric aircraft includes at least one set of a plurality of propulsors. The at least one set of a plurality of propulsors is coupled to the electric aircraft. In some embodiments, the system includes a flight controller coupled to the electric aircraft. The flight controller is configured to detect a state transition of the electric aircraft from the hover state to the fixed-wing flight state. In some embodiments, the flight controller is configured to send a parking command to the at least one set of a plurality of propulsors.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Described herein is a system for propulsion management of an electric aircraft. In some embodiments, the system may include an electric aircraft. The electric aircraft may be configured to transition between a hover state and a fixed-wing flight state. In some embodiments, the electric aircraft may include at least one set of a plurality of propulsors. The at least one set of a plurality of propulsors may be coupled to the electric aircraft. In some embodiments, the system may include a flight controller coupled to the electric aircraft. The flight controller may be configured to detect a state transition of the electric aircraft from the hover state to the fixed-wing flight state. In some embodiments, the flight controller may be configured to send a parking command to the at least one set of a plurality of propulsors.

Described herein is a method of propulsor management of an electric aircraft. In some embodiments, the method may include selecting an electric aircraft configured to transition between a hover state and a fixed-wing flight state. In some embodiments, the electric aircraft may include at least one set of a plurality of propulsors coupled to the electric aircraft. In some embodiments, the method may include determining a state of the electric aircraft via a flight controller. In some embodiments, the flight controller may be configured to detect a state transition of the electric aircraft. In some embodiments, the method may include sending, via the flight controller, a parking command to the at least one set of a plurality of propulsors. In some embodiments, the method may include moving, via at least a first set of inverters, at least one propulsor of the at least one set of propulsors into a parked position.

Figure 1:
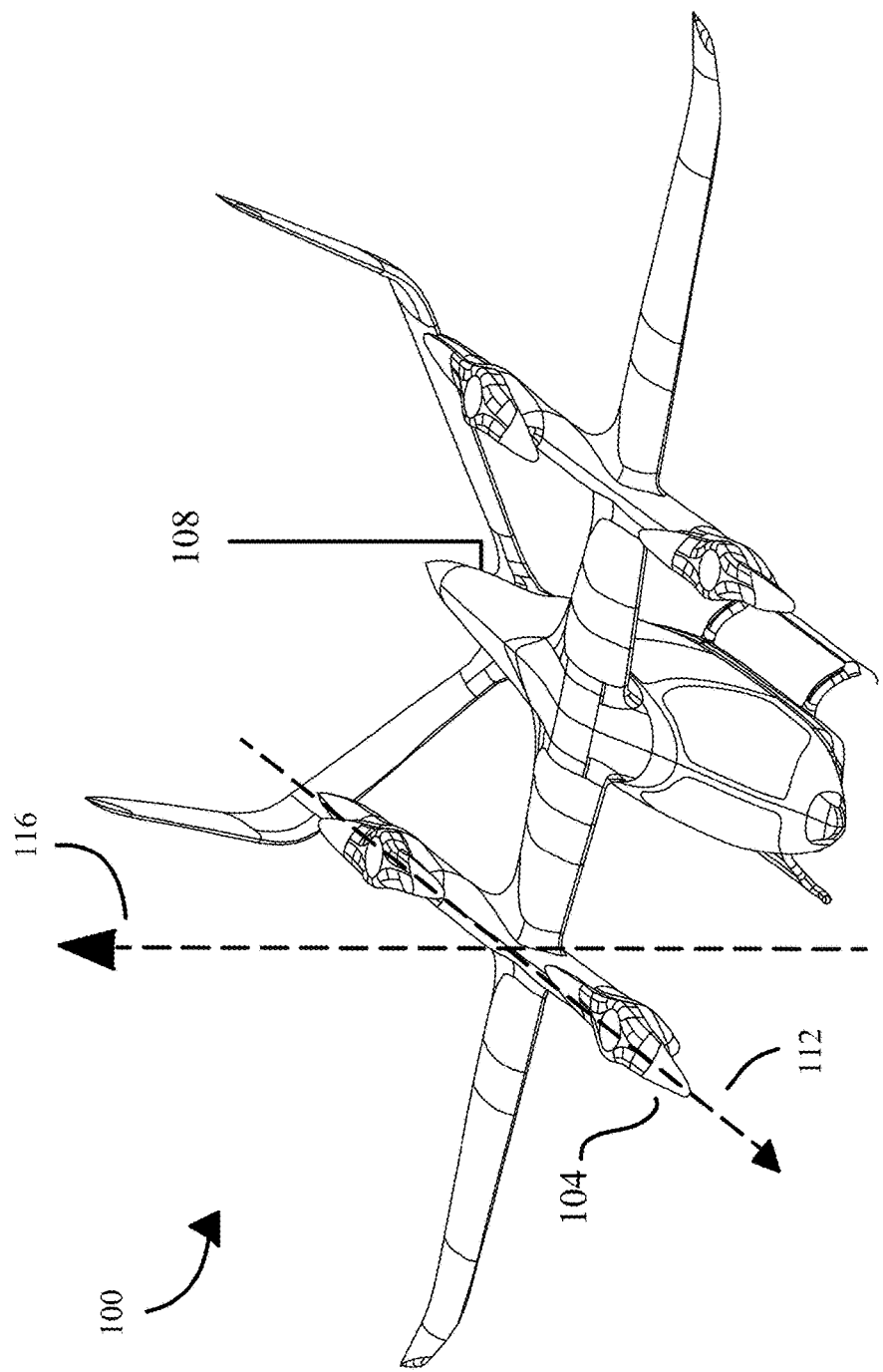
FIG. 1 is a front view of an exemplary embodiment of an electric aircraft.

Referring now to FIG. 1, an illustration of an exemplary embodiment of an electric aircraft 100 is shown. Electric aircraft 100 may include a vertical takeoff and landing aircraft (eVTOL). As used herein, a vertical take-off and landing (eVTOL) aircraft is an electrically powered aircraft that can take off and land vertically; eVTOL aircraft may be capable of hovering. In order without limitation to optimize power and energy necessary to propel an eVTOL or to increase maneuverability, the eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," helicopter, or other vehicle that maintains its lift primarily using downward thrusting propulsors. Fixed-wing flight, as described herein, flight using wings and/or foils that generate life caused by an aircraft's forward airspeed and the shape of the wings and/or foils, such as in airplane-style flight.

With continued reference to FIG. 1, a number of aerodynamic forces may act upon electric aircraft 100 during flight. Forces acting on an electric aircraft 100 during flight may include, without limitation, thrust, a forward force produced by a propulsor of electric aircraft 100, which may acts parallel to a longitudinal axis of the aircraft. Another force acting upon electric aircraft 100 may include, without limitation, drag, defined as a rearward retarding force which is caused by disruption of airflow by any protruding surface of electric aircraft 100 such as, without limitation, a wing, rotor, and/or fuselage. Drag may oppose thrust and act rearward parallel to relative wind. A further force acting upon electric aircraft 100 may include, without limitation, weight, which may include a combined load of the electric aircraft 100 itself, crew, baggage, and/or fuel. Weight may pull electric aircraft 100 downward due to the force of gravity. An additional force acting on electric aircraft 100 may include, without limitation, lift, which may act to oppose the downward force of weight and may be produced by a dynamic effect of air acting on an airfoil and/or downward thrust from a propulsor of the electric aircraft. Lift generated by an airfoil may depend on speed of airflow, density of air, total area of the airfoil and/or a segment thereof, and/or an angle of attack between air and the airfoil. In a non-limiting example, electric aircraft 100 may be designed to be as lightweight as possible. Reducing weight of an aircraft and designing to reduce a number of components may optimize weight. To save energy, it may be useful to reduce weight of components of an electric aircraft 100, including without limitation propulsors and/or propulsion assemblies.

Referring still to FIG. 1, electric aircraft 100 may include at least a vertical propulsor 104 and at least a forward propulsor 108. At least a forward propulsor 108 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, take-off, and/or landing, and/or may propel the aircraft forward or backward on the ground. At least a vertical propulsor 104 and at least a forward propulsor 108 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 1, a "vertical propulsor" as used in this disclosure is a propulsor that propels an aircraft in an upward direction; one or more vertical propulsors may be mounted on the front, on the wings, at the rear, and/or any suitable location. A "propulsor," as used in this disclosure, is a component or device used to propel a craft by exerting force on a fluid medium, which may include a gaseous medium such as air or a liquid medium such as water. At least a vertical propulsor 104 may generate a substantially downward thrust, tending to propel an aircraft in a vertical direction providing thrust for maneuvers such as without limitation, vertical take-off, vertical landing, hovering, and/or rotor-based flight such as "quadcopter" or similar styles of flight. Vertical propulsors 104 may have a horizontal axis 112. In some embodiments, vertical propulsors 104 may have a vertical axis 116. In some embodiments, horizontal axis 112 may be a minimum drag axis. A "minimum drag axis," as defined in this disclosure, is an axis that, when aligned with a direction of airflow and/or relative wind at a propulsor 104, produce a minimal amount of drag on the vertical propulsor 104, as described in further detail below.

Figure 2:
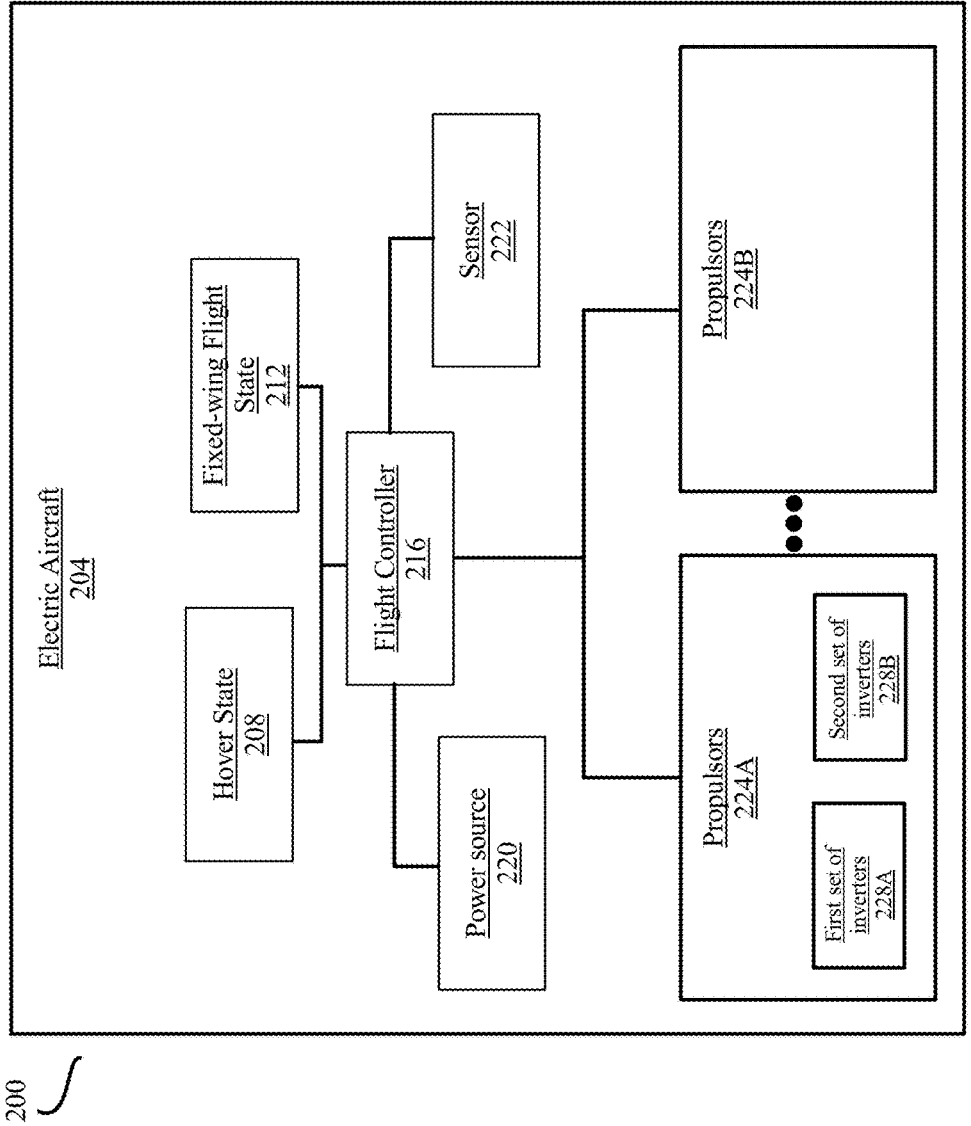
FIG. 2 is front view of an exemplary embodiment of a block diagram of a system of management for propulsors of an electric aircraft.

Referring now to FIG. 2, an exemplary embodiment of a propulsor management system 200 is illustrated. System 200 may include an electric aircraft 204. In some embodiments, electric aircraft 204 may be an eVTOL. In some embodiments, electric aircraft 204 may have one or more states of operation. Electric aircraft 204 may have a hover state 208. In hover state 208, electric aircraft 204 may be moving through the air along a vertical path. Electric aircraft 204 may utilize propulsors 224a-b to generate a lift. As described above in FIG. 1, in some embodiments, electric aircraft may be in hover state 208 during liftoff operations. In another embodiment, electric aircraft 202 may be in hover state 204 in landing operations. In other embodiments, hover state 208 may be when electric aircraft 204 maintains an altitude when airborne. Electric aircraft 204 may use propulsors 224a-b to achieve ascent and descent in hover state 208. As described in FIG. 1, in some embodiments, electric aircraft 204 may have a fixed-wing flight state 212. Electric aircraft 204 may be in fixed-wing flight state 212 during forward, backward, and sideways propulsion. Fixed-wing flight state 212 may include edgewise flight. In some embodiments, electric aircraft 204 may have a first set of propulsors 224A. First set of propulsors 224A may be used in hover state 204. In other embodiments, electric aircraft 204 may have a second set of propulsors 224B for fixed-wing flight state 212. In some embodiments, electric aircraft 204 may use the same set of propulsors for both hover state 204 and fixed-wing flight state 206. System 200 may include a flight controller 216.

Still referring to FIG. 2, flight controller 216 may communicate with at least a sensor 232. In some embodiments, sensor 232 may be configured to detect a plurality of flight operations of electric aircraft 204. In some embodiments, sensor 232 may detect a change of electric aircraft 204 during a transition of electric aircraft 204 between fixed-wing flight state 212 and hover state 208. In some embodiments, sensor 232 may include one or more motion sensors, which may include any element suitable for use as an inertial measurement unit (IMU) or any component thereof, including without limitation one or more accelerometers, one or more gyroscopes, one or more magnetometers, or the like. Motion sensors may be selected to detect motion in three directions spanning three dimensions for instance, a set of three accelerometers may be configured or arranged to detect acceleration in three directions spanning three dimensions, such as three orthogonal directions, or three gyroscopes may be configured to detect changes in pitch spanning three dimensions, such as may be achieved by three mutually orthogonal gyroscopes. Sensor 232 may include one or more environmental sensors, including without limitation sensors for detecting wind, speed, temperature, or the like. In some embodiments, sensor 232 may include an altimeter. In some embodiments, sensor 232 may be configured to measure physical and/or electrical parameters, such as without limitation temperature and/or voltage, of electric aircraft 208 and propulsors 224a-b. Sensor 232 and/or a control circuit incorporated therein and/or communicatively connected thereto, may further be configured to detect voltage and current of a first and second set of inverters 228a-b. Detection may be performed using any suitable component, set of components, and/or mechanism for direct or indirect measurement and/or detection of voltage levels, including without limitation comparators, analog to digital converters, any form of voltmeter, or the like.

Outputs from sensor 232 or any other component present within system may be analog or digital. Onboard or remotely located processors can convert those output signals from sensor suite to a usable form by the destination of those signals. The usable form of output signals from sensors, through processor may be either digital, analog, a combination thereof or an otherwise unstated form. Processing may be configured to trim, offset, or otherwise compensate the outputs of sensor suite. Based on sensor output, the processor can determine the output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components.

With continued reference to FIG. 2, system 200 may have at least a first set of inverters 228A. At least a first set of inverters 228A may be configured to operably move the propulsors 224A-B. At least a first set of inverters 228A may be coupled to propulsors 224A-B. In some embodiments, at least a first set of inverters 228A may include a plurality of components to apply a torque to propulsors 224A-B. In some embodiments, at least a first set of inverters 228A may include a plurality of inverters that may be configured to transform DC power to AC power. The AC power may be used to drive the motor by adjusting the frequency and voltage supplied to the motor. In some embodiments, at least a first set of inverters 210 may be configured to output between 100 and 300 kwh of electrical power to a propulsor of propulsors 212. In some embodiments, at least a first set of inverters 210 may be configured to output 200 kwh of electrical power to a propulsor of propulsors 212. The inverter may be entirely electronic or a combination of mechanical elements and electronic circuitry. The invertor may allow for variable speed and torque of the motor based on the demands of the vehicle. In some embodiments, inverters of at least a first set of inverters 228A may include a plurality of wires. The plurality of wires may be wound around one or more stators of propulsors 224a-b. The plurality of wires may have multiple windings around one or more stators of propulsors 224a-b. In some embodiments, each winding of the plurality of wires may be connected to a different inverter. Flight controller 216 may be configured to communicate data to and from the at least a first set of inverters 210. In some embodiments, flight controller 208 may communicate data to and from the at least a first set of inverters 210 wirelessly. In other embodiments, flight controller 216 may communicate data to and at least a first set of inverters 228A via a wired connection. In some embodiments, flight controller 216 may be configured to send commands to at least a first set of inverters 228A. In some embodiments, flight controller 216 may send a command to at least a first set of inverters 228A to apply a torque to at least one propulsor of propulsors 224a-b of electric aircraft 204. In some embodiments, flight controller 216 may be configured to send commands to a second set of inverters 228B to apply a torque to at least one propulsor of propulsors 224a-b. In some embodiments, flight controller 216 may send a command to inverters 224a-b to hold at least one propulsor of the propulsors 224a-b in a fixed position.

In some embodiments, and with continued reference to FIG. 2, flight controller 216 may send a command to at least a first set of inverters 228A to apply a clockwise torque to propulsors 224a-b. In other embodiments, flight controller 216 may send a command to at least a first set of inverters 228A to apply a counter-clockwise torque to at least one propulsor of propulsors 224a-b of electric aircraft 204. In some embodiments, flight controller 216 may send a command to at least a first set of inverters 228A to apply zero torque to propulsors 224a-b. In some embodiments, propulsor management system 200 may have a second set of inverters 228B. Flight controller 216 may send a command to the second set of inverters 228B to hold at least one propulsor of the propulsors 224a-b in a stationary position. In some embodiments, second set of inverters 228B may be configured to generate a magnetic field. In some embodiments, second set of inverters 228B may include multiple windings of a conductive wire. The windings may have a current running through them that may induce a magnetic field. Inverters 228B may use a magnetic field to hold propulsors 224a-b in a static position. In some embodiments, flight controller 216 may send commands to at least a first set of inverters 228A to move propulsors 224a-b within a tolerance range in deviation from an axis. In some embodiments, the tolerance range may be +2 degrees. In other embodiments, the tolerance range may be −2 degrees. In yet other embodiments, the tolerance range may be between −10 degrees to +10 degrees. In other embodiments, the tolerance may be greater than or less than between −10 degrees to +10 degrees. In some embodiments, the tolerance range may be determined based on battery levels of electric aircraft 204. In other embodiments, the tolerance range may be determined based on heating caused by the parking and unparking of propulsors 224a-b.

Further referring to FIG. 2, flight controller 216 may be configured to detect a transition of electric aircraft 200 between hover state 208 and fixed-wing flight state 212. In some embodiments, flight controller 216 may be configured to receive data from sensor 232. As described above, sensor 232 may detect a change of a variety of parameters of electric aircraft 204. Sensor 232 may detect a change in motion, wind speed, wind direction, altitude, or other parameter changes. Sensor 232 may send data to flight controller 216 communicating a change in a parameter of electric aircraft 204. Flight controller 216 may process the data received from sensor 232. Flight controller 216 may determine that electric aircraft 204 should transition from hover state 208 to fixed-wing flight state 212 and vice versa. In some embodiments, flight controller 216 may determine a state transition is needed based on the data from sensor 232. In other embodiments, flight controller 216 may determine that a state transition is needed based on a flight plan. In other embodiments, flight controller 216 may determine that a state transition is needed based on detection of a plurality of flight conditions, such as stall. In some embodiments, flight controller 216 may determine a state transition is need based on an automated decision-making process. The automated decision-making process may include artificial intelligence and machine learning.

Still referring to FIG. 2, flight controller 216 may be configured to send a plurality of commands to at least a first set of inverters 228A upon detection of a transition between hover state 208 and fixed-wing state 212. In some embodiments, flight controller 216 may detect that electric aircraft 204 is in hover state 208. Flight controller 216 may send a command to at least a first set of inverters 228A to position propulsors 224a-b in a position configured for vertical aerial maneuvers. In some embodiments, flight controller 216 may send a command to at least a first set of inverters 228A to enable propulsors 224A to freely rotate. In hover state 208, propulsors 224a-b may generate lift to move electric aircraft 204 along a vertical path. Flight controller 216 may detect electric aircraft 204 in fixed-wing flight state 212. In some embodiments, in fixed-wing flight state 212, flight controller 216 may send a command to second set of inverters 228B to hold a set of propulsors of propulsors 224a-b in a position to reduce air resistance across propulsors 224a-b. A minimum drag axis of each propulsor of plurality of propulsors 224a-b may be aligned along a longitudinal axis of electric aircraft 204 as described below in FIG. 3. In other embodiments, flight controller 216 may determine a minimal drag axis of electric aircraft 212. Drag may oppose thrust and act rearward parallel to relative wind. In some embodiments, the minimal drag axis may be a path along electric aircraft 204 that may reduce drag across electric aircraft 204. In some embodiments, the minimal drag axis may align with a distal end of a first blade of electric aircraft 204 to a distal end of a second blade of electric aircraft 204, as described above in FIG. 1. In other embodiments, flight controller 208 may determine a minimal drag axis based on surrounding airflow of electric aircraft 212. The surrounding airflow may include relative wind of electric aircraft 204. Relative wind may be a direction of movement of the atmosphere relative to electric aircraft 204. In some embodiments, relative wind may be in opposite direction to a movement of electric aircraft 204. Flight controller 208 may send a command to at least a first set of inverters 210 to position propulsors 212 to point towards a direction of surrounding airflow in order to reduce drag.

Figure 3:
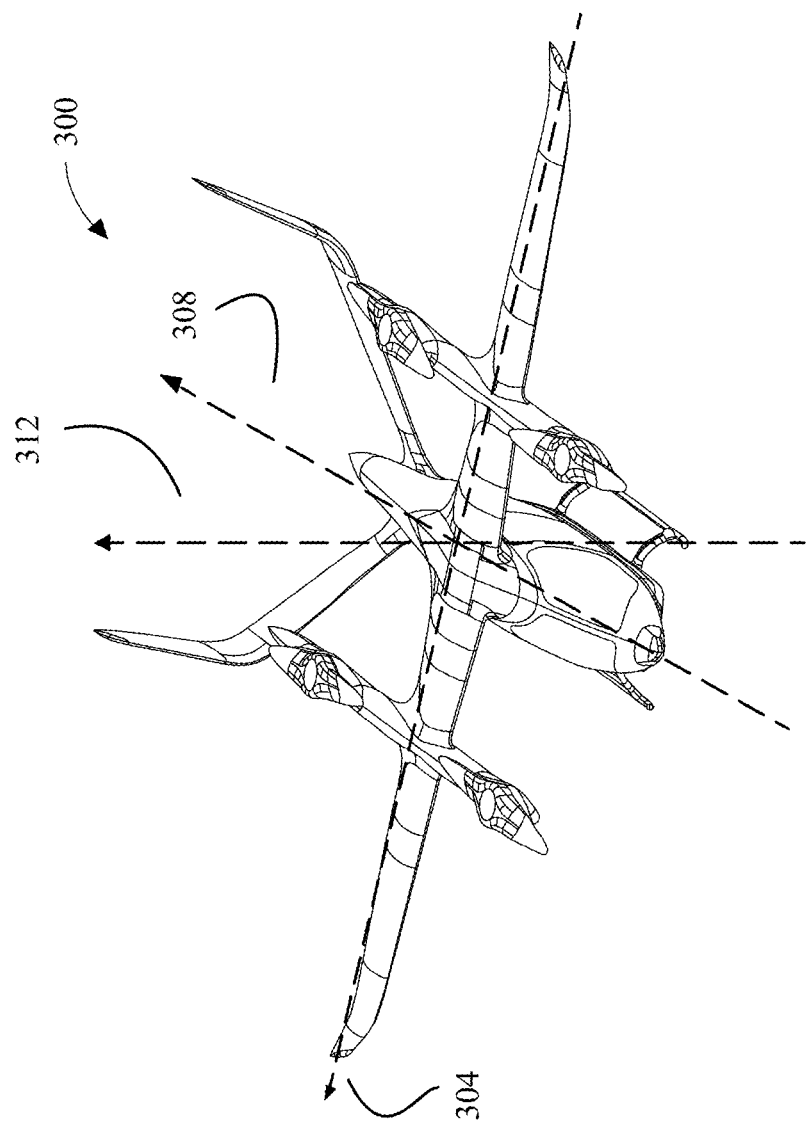
FIG. 3 is a front view of an exemplary embodiment of multiple axis of an electric aircraft.

Now referring to FIG. 3, an exemplary embodiment of a plurality of axis of an electric aircraft is presented. Electric aircraft 300 may have a transverse axis 304. Transverse axis 304 may have an origin at a center of gravity of electric aircraft 300. Transverse axis 304 may be a parallel to a line drawn from one distal end of a wingtip to another opposing distal end of a second wingtip. In some embodiments, motion about transverse axis 304 may be referred to as pitch. Electric aircraft 300 may have longitudinal axis 308. In some embodiments, longitudinal axis 308 may be referred to as the pitch axis. In some embodiments, longitudinal axis 308 may have an origin at a center of gravity of electric aircraft 300. In some embodiments, longitudinal axis 308 may be directed forward, parallel to a fuselage reference line. In some embodiments, motion about longitudinal axis 308 may be referred to as roll. In some embodiments, angular displacement about longitudinal axis 304 may be referred to as bank. Electric aircraft 300 may have vertical axis 312. In some embodiments, vertical axis 312 may have a center of gravity at electric aircraft 300. In some embodiments, vertical axis 312 may be directed towards the top and/or bottom of electric aircraft 300. In some embodiments, vertical axis 312 may be referred to as the yaw axis. In some embodiments, vertical axis 312 may be perpendicular to the wings of electric aircraft 300. Motion about vertical axis 312 may be referred to as yaw.

Figure 4:
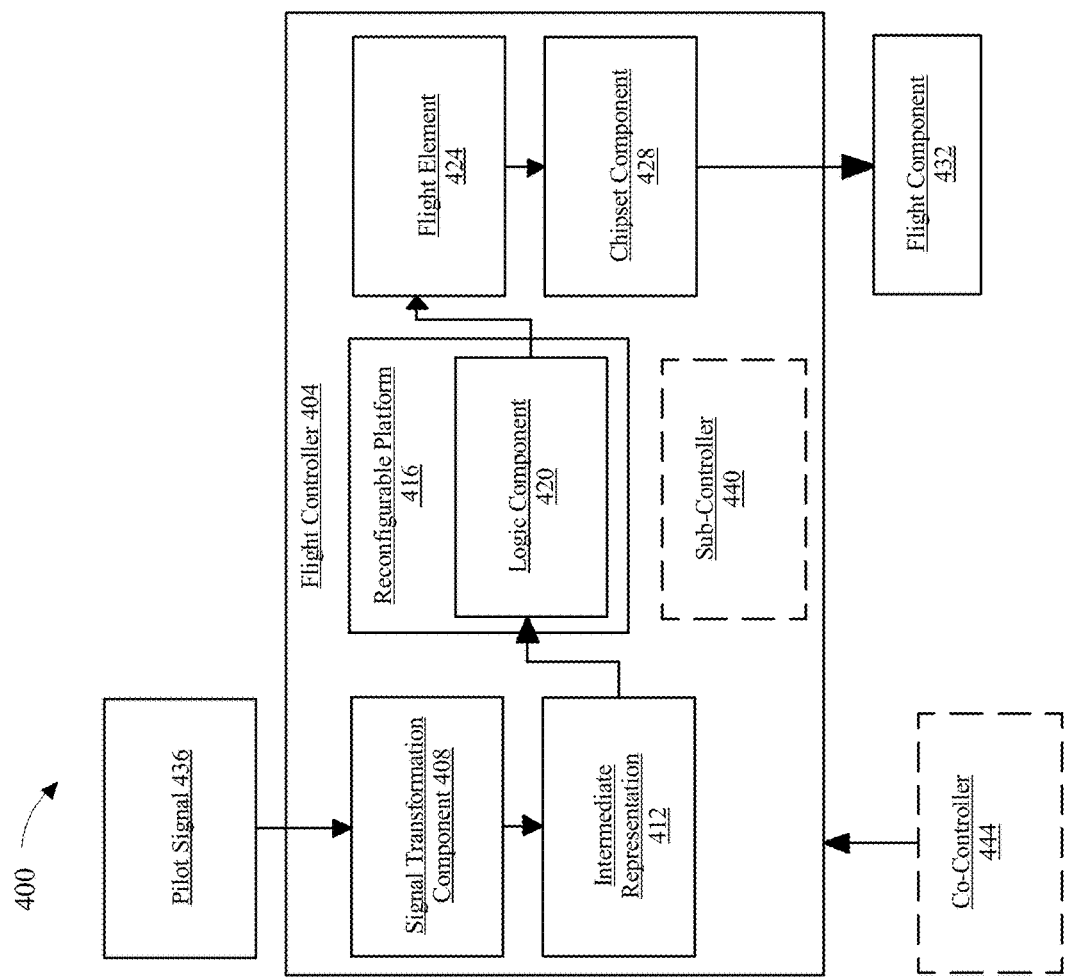
FIG. 4 is a block diagram of an exemplary embodiment of a flight controller system.

Now referring to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 432. As used in this disclosure a "flight component" is a portion of an aircraft that can be moved or adjusted to affect one or more flight elements. For example, flight component 432 may include a component used to affect the aircrafts' roll and pitch which may comprise one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
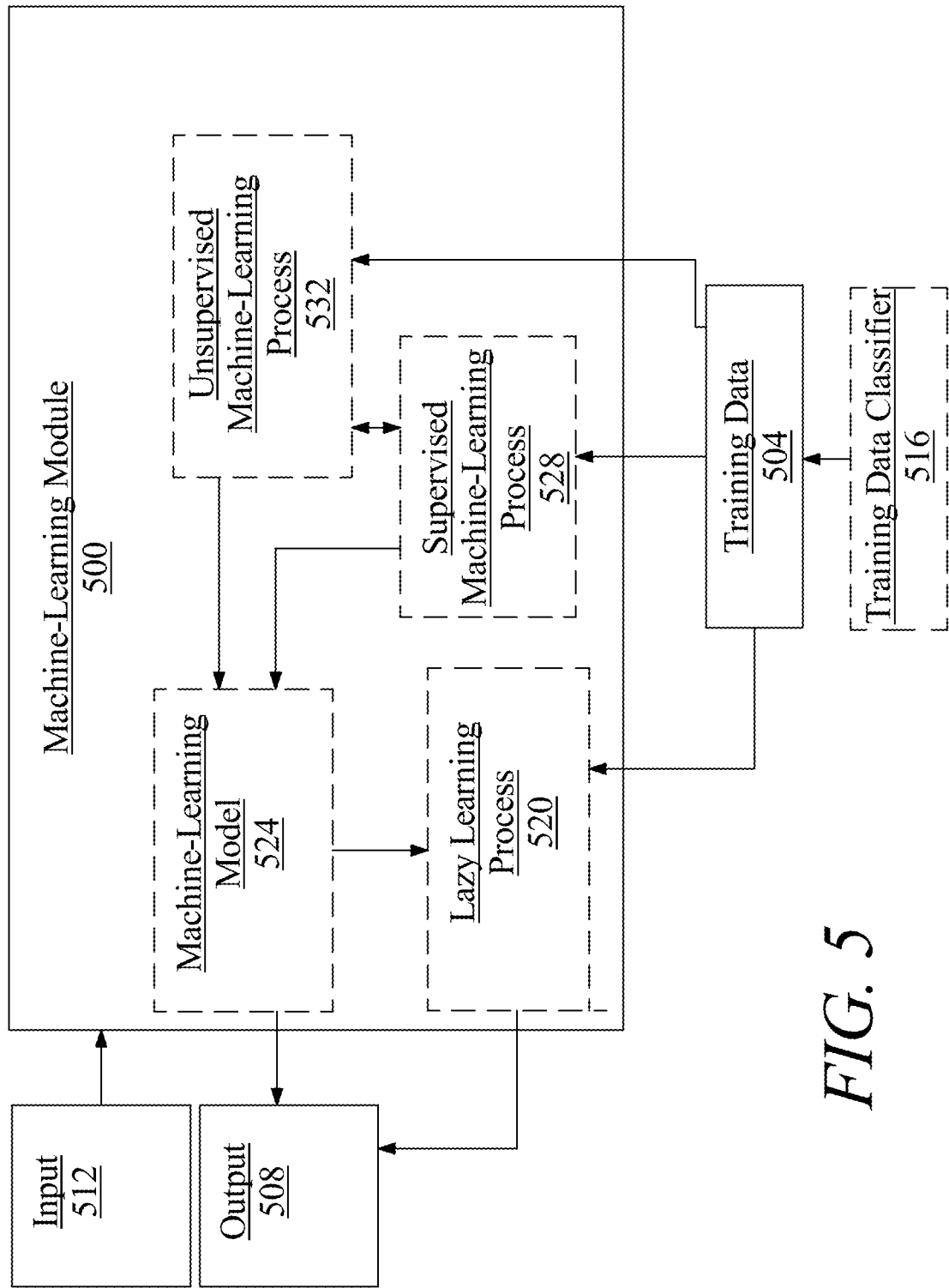
FIG. 5 is a flowchart of an exemplary embodiment of a method of managing propulsors of an electric aircraft.

Referring now to FIG. 5, an exemplary embodiment of a machine-learning module 500 that may perform one or more machine-learning processes as described in this disclosure is illustrated. Machine-learning module 500 may be implemented in the determination of the flight states of the electric aircraft. Machine-learning module 500 may communicated with the flight controller to determine a minimal drag axis for the electric aircraft. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
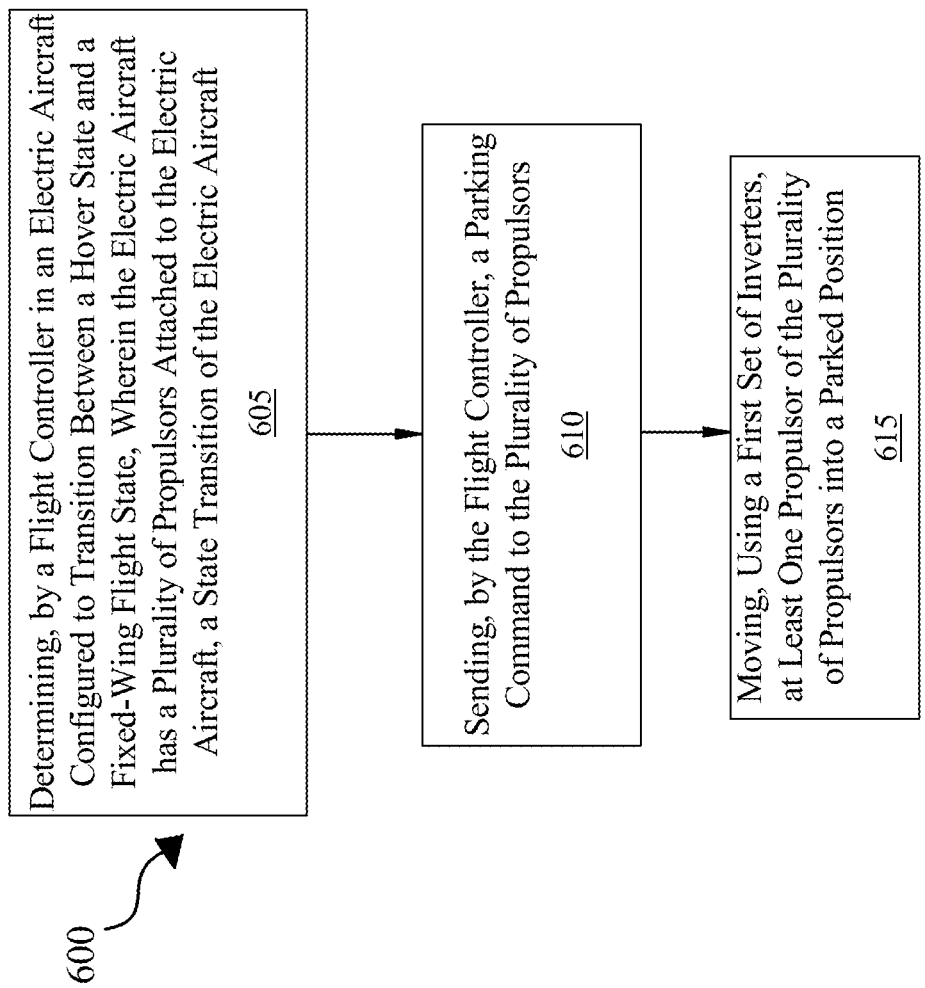
FIG. 6 is a is a block diagram of an exemplary embodiment of a computing system.

Now referring to FIG. 6, a method 600 for propulsor management of an electric aircraft is presented. At step 605, a state of transition of an electric aircraft configured to transition between a hover state and a fixed-wing state is determined by a flight controller; this may be implemented, without limitation, as described above in reference to FIGS.

1-5. In some embodiments, the electric aircraft has a plurality of propulsors. In some embodiments, the plurality of propulsors includes vertical propulsors. In some embodiments, the electric aircraft is an eVTOL. In some embodiments, the hover state may be a state in which the electric aircraft moves along a vertical path. In some embodiments, this may include a vertical takeoff, a vertical landing, or maintaining an altitude while airborne. In some embodiments, the fixed-wing flight state may include edgewise flight. In some embodiments, fixed-wing flight may include movement of the electric aircraft through the air forwards, backwards, and sideways. In some embodiments, the flight controller may determine a state of transition of the electric aircraft through a sensor. In some embodiments, the sensor may include motion, altitude, wind direction, pressure, or other sensors. In some embodiments, the flight controller may be configured to receive data from the sensor. In some embodiments, the flight controller may process the data to determine if a transition to a different state is needed. In some embodiments, the flight controller may determine if a transition of states is needed based on sensor data, flight plans, automated plans, and/or flight maneuver characteristics such as stall.

At step 610, the flight controller sends a parking command to the plurality of propulsors. The parking command may be sent through a wired or wireless connection. This may be implemented, without limitation, as described above in reference to FIGS. 1-5. The parking command may include a command to position the plurality of propulsors to align with an axis of minimized drag. In some embodiments, the flight controller may send an unparking command to enable the plurality of propulsors to freely rotate. In some embodiments, the parking command may include data to align the plurality of propulsors with a direction of airflow in order to reduce drag.

At step 615 the plurality of propulsors are moved using a first set of inverters into a parked position. This may be implemented, without limitation, as described above in reference to FIGS. 1-5. In some embodiments, the first set of inverters may be configured to apply a torque to the plurality of propulsors when the parking command is received. In other embodiments, there may be a second set of inverters. The second set of inverters may be configured to apply a torque to the plurality of propulsors when the parking command is received. In some embodiments, the first and second set of inverters may transform DC into AC power. In some embodiments, the first set of inverters may hold at least one propulsor of the plurality of propulsors in place. In some embodiments, the second set of inverters may apply a torque to at least one propulsor of the plurality of propulsors. In some embodiments, the torque applied is zero.

Figure 7:
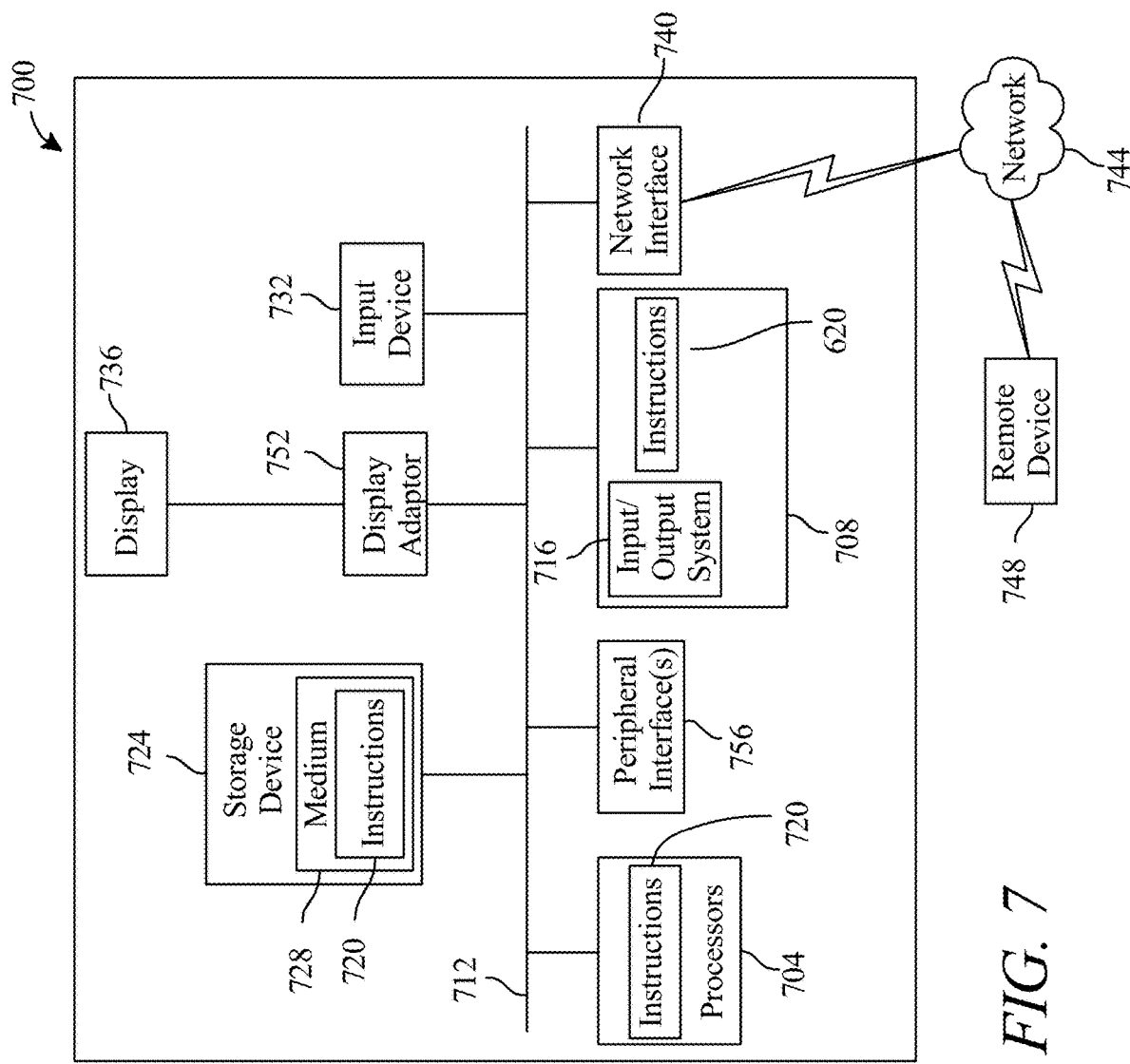
FIG. 7 is an exemplary embodiment of a machine learning system.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for propulsion management of an electric aircraft, the system comprising:
    an electric aircraft configured to transition between a hover state and a fixed-wing flight state;
    a plurality of propulsors coupled to the electric aircraft, wherein a first propulsor of the plurality of propulsors includes a first inverter and a second inverter; and
    a flight controller coupled to the electric aircraft, wherein the flight controller is configured to detect a state transition of the electric aircraft from the hover state to the fixed-wing flight state and send a parking command to the plurality of propulsors, and wherein:
        the parking command causes the first inverter to move the first propulsor to a parked position; and
        the parking command causes the second inverter to hold the first propulsor in the parked position.

2. The system of claim 1, wherein the electric aircraft includes an electric vertical takeoff and landing (eVTOL) aircraft.

3. The system of claim 1, wherein a minimum drag axis of each propulsor of the plurality of propulsors is configured to align with a direction of airflow when receiving the parking command.

4. The system of claim 1, wherein a minimum drag axis of each propulsor of the plurality of propulsors is configured to align with a longitudinal axis of the electric aircraft when receiving the parking command.

5. The system of claim 1, wherein the flight controller is configured to send the parking command to park at least the first propulsor of the plurality of propulsors to be aligned with a longitudinal axis or airspeed direction within a 2-degree tolerance level.

6. The system of claim 1, wherein at least the first propulsor of the plurality of propulsors further comprises:
    an axis of rotation;
    a first blade having a first distal end and a first proximal end, wherein the first distal end is farther from the axis of rotation than the first proximal end;
    a second blade positioned opposite the first blade, the second blade having a second distal end and a second proximal end, wherein the second distal end is farther from the axis of rotation than the second proximal end.

7. The system of claim 6, wherein the at least a first propulsor has a minimal drag axis running from the first distal end to the second distal end.

8. The system of claim 1, wherein the flight controller is configured to detect a transition of the electric aircraft from the fixed-wing flight state to the hover state.

9. The system of claim 8, wherein the flight controller is configured to send a command to at least the first propulsor of the plurality of propulsors to unpark.

10. A method of propulsor management of an electric aircraft, the method comprising:
    determining, by a flight controller coupled to an electric aircraft, a state transition of the electric aircraft between a hover state of the electric aircraft and a fixed-wing flight state of the electric aircraft, wherein the electric aircraft includes a plurality of propulsors coupled to the electric aircraft, and wherein a first propulsor of the plurality of propulsors includes a first inverter and a second inverter;

sending, by the flight controller, a parking command to the plurality of propulsors;

moving, as a function of the parking command, using a first inverter, the first propulsor to a parked position; and holding, as a function of the parking command, using a second inverter, the first propulsor in the parked position.

11. The method of claim 10, wherein the electric aircraft includes an electric vertical takeoff and landing (eVTOL) aircraft.

12. The method of claim 10, wherein the first inverter is configured to apply a torque to a propulsor of the plurality of propulsors when the parking command is received from the flight controller.

13. The method of claim 10, wherein the flight controller is configured to sense and determine an optimal alignment of drag reduction of the electric aircraft.

14. The system of claim 10, wherein at least the first propulsor of the plurality of propulsors is aligned with a minimal drag axis of a direction of airflow.

15. The system of claim 10, wherein at least the first propulsor of the plurality of propulsors is aligned with a longitudinal axis of the electric aircraft.

16. The system of claim 10, wherein at least the first propulsor of the plurality of propulsors further comprises two blades positioned opposite one another.

17. The system of claim 16, wherein a minimal drag axis aligns along a path from a first distal end of a first blade of the two blades to a second distal end of a second blade of the two blades.

18. The system of claim 10, wherein the system further comprises a machine-learning module in communication with the flight controller.

19. The system of claim 18, wherein the machine-learning module is configured to determine at least one of the hover state and the fixed-wing flight state of the electric aircraft.

20. The system of claim 18, wherein the machine-learning module is configured to determine a minimal drag axis of the electric aircraft.

* * * * *